United States Patent Office 3,788,862
Patented Jan. 29, 1974

3,788,862
PARTIALLY SIMULATED TOMATO PRODUCT
Maurice W. Hoover and Rhea M. Hoover, both of 920 Merwin Road, Raleigh, N.C. 27606
No Drawing. Continuation of application Ser. No. 750,468, Aug. 6, 1968. This application Nov. 3, 1971, Ser. No. 195,380
Int. Cl. A23l 1/00, 1/40
U.S. Cl. 426—177                                11 Claims

ABSTRACT OF THE DISCLOSURE

A partially simulated tomato product comprising tomato solids, an admixture of starch, de-oiled soy meal and animal protein, sweetening agents, and edible organic acid crystals.

DESCRIPTION

This is a continuation of application Ser. No. 750,468, filed Aug. 6, 1968.

This invention relates to food products and more particularly to tomato products and the process for preparing the same.

In the past, various food processes have been developed using various forms of filler such as starch. The resulting products, however, have usually been obviously changed from their original state. Examples of such products include the "creamed" products such as creamed corn, or peas as well as various types of "a la kings."

The present invention, on the other hand, discloses a process of preparing a food product in which an undiscernable substitution is made for a portion of the natural product. Since the substitution is not noticeable, the end product is as sellable as the original without apparent dilution of quality but at a much lower price than the pure product.

In accomplishing the above, either a starch, corn meal, a soy product or an animal protein along with preservatives, flavorings, and colorings are substituted for a relatively large portion of the natural tomato solids in a tomato product. This new, partially substituted product contains all of the obvious characteristics of a pure and natural pulped or pureed single and concentrated tomato in appearance, flavor and texture. This new product can be used as a basic tomato paste or with adjustments in moisture and spices for such products as ketchup, tomato juice cocktail, shrimp sauce, pizza sauce, and the like.

It is an object, therefore, of the present invention to provide a tomato product composed basically of a dry filler, flavoring, coloring and a hydrating tomato product.

Another object of the present invention is to provide a food product having animal protein substituted for a portion of the natural product in combination with proper flavoring and coloring to produce a protein containing product.

A further object of the present invention is to provide a partially simulated product using a liquefied, natural byproduct of the product to be imitated to hydrate the same.

Another object of the present invention is to provide a food product having a soy product substituted for a portion of the natural product.

Other objects and advantages of the present invention will become apparent and obvious from a study of the following description which is merely illustrative of the present invention.

Basically the process consists of substituting for a portion of the natural tomato solids a sizeable quantity of either starch, corn meal, soy products, or animal protein in combination with corn syrup or cane sugar, organic acid, cellulose or other types of gums, food grade coloring material, salt, monosodium glutamate, and tomato flavoring material in sufficient quantities to closely simulate the tomato juice, puree, tomato paste, or the like being produced. As indicated above, with addition of proper spices and possible adjustments in the moisture content, products such as ketchup, tomato juice cocktail, pizza sauce and the like may be produced.

A typically partially simulated tomato paste produced in accordance with the teachings of the present invention would contain the following ingredient percentages based on a fresh weight basis: fresh, canned or frozen single strength tomato juice 67.2 percent; twenty-six to thirty-two Brix tomato paste 16.8 percent; dextrose or its equivalent 7.4 percent; starch, corn meal, soy flour (after oil removed) or animal protein 5.1 percent; sodium chloride 0.74 percent; burnt caramel syrup 0.74 percent; cellulose gum or its equivalent 0.67 percent; tomato flavoring 0.37 percent; citric-malic acid mixture 0.44 percent; monosodium glutamate 0.1 percent; and tomato red dye 0.014 percent.

Based on the above percentages, a typical pilot plant batch of partially simulated tomato paste would contain the following measures of ingredients: 12 pounds (5448 grams) single strength tomato juice, 3 pounds (1362 grams) tomato paste, 1.3 pounds (600 grams) dextrose, 414 grams textured starch, 54 grams methy-ethyl cellulose gum, 60 grams sodium chloride salt, 18 grams citric acid, 18 grams malic acid, 80 grams burnt caramel syrup, 7 grams monosodium glutamate, 1.2 grams tomato red dye, and 60 grams of tomato flavor previously diluted to 50 percent with water.

In producing a batch of tomato paste similar to that described above, if a partially simulated tomato puree is deemed necessary or desirable, it could easily be accomplished by diluting the tomato paste called for with water to give the correct and desired viscosity. This is possible because natural tomato puree normally contains less than 26 percent solids whereas tomato paste is required to contain at least 26 percent tomato solids. Any additives that are added must be taken into consideration in determining the proper viscosity of the final product.

It has been found desirable to hydrate the starch (or soy flour or animal protein or corn meal if one of these are substituted for the starch) and other dry ingredients with a single strength, fresh, canned or frozen tomato juice. The reason for using this single strength tomato juice rather than water for rehydrating the dry ingredients is first, to increase the tomato solids in the final product and secondly, to better flavor the product due to the fact that the volatile constituents remain in the juice. On the contrary, natural tomato paste production results in the loss of volatiles and consequent flavor loss because of the vacuum concentration on such paste (or puree as the case may be). In addition to the above advantages of using single strength juice, an economic advantage is also accomplished in that less natural concentrated paste or puree is needed for maintaining the desired tomato solids in the product.

The method of preparing the typical pilot plant batch of partially simulated tomato paste takes the heat treated, single strength tomato juice and adds the mixture of dry ingredients containing the textured starch, the cellulose gum, the sugar, the sodium chloride, the citric acid crystals, the malic acid crystals, the monosodium glutamate, and the food grade tomato red dye. The juice and the dry ingredients are then mixed well while at the same time heat is applied until the temperature reaches approximately 175 degrees Fahrenheit. The tomato paste, the burnt caramel syrup and the tomato flavoring (50 percent solution) are then added to the hot mixture. This mixture is then again thoroughly mixed and the entire product is again brought up to 175 degrees Fahrenheit.

The product is then filled hot into containers and sealed. The sealed containers along with their contents are then placed in boiling water for a period of 25 minutes (sterilization time will vary with type and size of container) to sterilize the same prior to their being placed in water at tap temperature for cooling.

An alternative method of preserving the product is to dehydrate the product on a drum dryer heated with 35–40 p.s.i. steam pressure followed by grinding and sealing said product in a moist-proof container. Other methods contemplated include spray drying and vacuum drying in producing a dehydrated tomato product coming within the teachings of the present invention.

The reasons for including the various contents in the tomato product of the present invention are as follows: the single strength tomato juice is used for hydrating the various dry ingredients and also to impart better flavor to the product as hereinabove pointed out (also as hereinbefore mentioned, water could be used in conjunction with the tomato solids added but the flavor would not be as good as when tomato juice is used to hydrate the ingredients); the starch (or starch substitute) is added to give body or texture and viscosity to the product; the gum is added to prevent "weeping" of the liquid from the product and also to aid in obtaining better texture; the corn syrup solids, sucrose or dextrose is added to lend sweetness and flavor to the product and also to off-set the acid flavor due to the adjustment of the product pH (cane sugar could also be used to serve the same purpose); the sodium chloride is added to improve flavor; the organic acid is added to impart flavor and also to adjust the pH of the final product; the tomato paste is used to impart the natural tomato flavor and color to such product; the burnt caramel is added to improve flavor and adjust the color; the monosodium glutamate is added to the product as a flavor enhancer to emphasize the tomato flavor; the food grade tomato red dye is added to improve the color of the products; and finally the tomato flavor is added to improve the flavor of the partially simulated end product so that such product will be as natural tasting as possible.

Normally, between 35 and 40 percent tomato solids, on a dry-weight basis, is sufficient to simulate a tomato paste when sufficient substitute ingredient such as starch (or substitutes therefor), acids, coloring and flavoring are maintained. Tests have shown, however, that the range of tomato solids can be low as 25 percent and still maintain a fairly good quality end product. On the other hand, the tomato solids can range to as high percentage as economics will allow. It appears, however, that little or no quality advantage will accrue from increasing the tomato solids above 50 percent in the mixture.

From experience, it has been found that percentages of ingredients based on dry-weight measure to produce a satisfactory simulated tomato product can range as follows: tomato solid 25 to 75 percent (a portion of such solids being derived from the single strength nonconcentrated juice if such juice is used); starch 10 to 30 percent; cellulose gum or its equivalent 1 to 3 percent; dextrose or its sweetness equivalent 15 to 35 percent; sodium chloride 2 to 4 percent; citric and/or malic acid or their equivalent 1 to 3 percent; burnt caramel 2 to 3 percent; tomato red dye 0.02 to 0.08 percent; and tomato flavoring 0.5 to 1.5 percent. The pH of the final mixture should range from a pH of 4.0 to the pH of 4.4.

As should be obvious from the above description, soy flour or meal (after the oil has been removed) or corn meal can be substituted for the starch to make the final product even more economical to produce since soy products and corn meal are considerably less expensive than starch. The big advantage of substituting protein such as sodium caseinate or soy flour for either the starch or corn meal is that a protein containing tomato product is produced which, of course, has all of the natural advantages and health benefits of a protein product.

A portion of the food grade tomato red dye could be replaced with paprika without lowering the quality of the final product. If such product is to be dehydrated, additional flavoring should be added.

It is obvious that the present invention has the advantage of providing a partially simulated tomato product which provides a flavoring, coloring and texture that is undiscernible from the pure, natural product. The present invention also has the advantage of being simple and relatively inexpensive to produce and yet capable of being preserved in either canned form or as a dehydrated product.

The present invention may, of course, be carried out in other specific ways than those herein set forth without departing from the spirit and the essential characteristics of the invention. The present embodiments are, therefore, to be considered in all respects as illustrative and not restrictive and all changes coming within the meaning and equivalency range of the appended claims are intended to be embraced therein.

What is claimed is:

1. A partially simulated tomato product comprising: between 25 and 75 percent natural tomato solids based on dry-weight measure; extraneously added thereto between 10 and 30 percent food element based on dry-weight measure having an admixture of starch, de-oiled soy meal, and animal protein; between 15 and 35 percent, based on dry-weight measure, sweetening agent selected from the group consisting of dextrose, sugar, and artificial sweeteners; and between 1 and 3 percent, based on dry-weight measure, organic acid crystals in the form of approximate equal proportions of citric acid and malic acid to establish the product in the pH range from 4.0 to 4.4.

2. The product of claim 1 wherein between 1 and 3 percent eatable cellulose gum by dry-weight measure is added whereby "weeping" of the product is prevented.

3. The product of claim 1 wherein between 2 and 4 percent based on dry-weight measure sodium chloride is added to enhance the flavor of the product.

4. The product of claim 1 wherein between 2 and 3 percent of such product is burnt caramel which adds to the color and flavor of such product.

5. The product of claim 1 wherein between 0.02 and 0.08 percent based on dry-weight measure tomato red dye is added to enhance the color of said product.

6. The product of claim 1 wherein between 0.5 and 2.0 percent based on dry-weight measure tomato flavoring is added to the product.

7. The product of claim 1 wherein a hydrating agent of single strength tomato juice is added to said product.

8. The product of claim 1 wherein a hydrating agent of water is added to said product.

9. A partially simulated tomato product comprising: between 25 and 75 percent tomato solid; extraneously add thereto between 10 and 30 percent food element having an admixture of starch, de-oiled soy meal, and animal protein; between 1 and 3 percent eatable cellulose gum; between 15 and 35 percent sweetening agent selected from the group consisting of dextrose, sugar and artificial sweeteners; between 2 and 4 percent sodium chloride; between 1 and 3 percent organic acid in the form of approximate equal amounts of citric acid and malic acid thereby establishing a pH in the range from 4.0 to 4.4 for the product; between 2 and 3 percent burnt caramel; between 0.02 and 0.08 percent tomato red dye; between 0.05 and 2.0 percent tomato flavoring; and a hydrating agent selected from the group consisting of single strength tomato juice, and water to hydrate the product to desired viscosity.

10. A partially simulated tomato product comprising: between 25 and 75 percent natural tomato solids based on dry-weight measure; extraneously added thereto between 10 and 30 percent food element based on dry-weight measure having an admixture of starch, de-oiled soy meal, and animal protein; between 15 and 35 percent, based on dry-weight measure, sweetening agent selected from the group consisting of dextrose, sugar, and artificial sweeteners; and between 1 and 3 percent, based on dry-weight measure, organic acid crystals selected from the group consisting of citric acid, and malic acid to establish the product in the pH range from 4.0 to 4.4.

11. A partially simulated tomato product comprising: between 25 and 75 percent tomato solid; extraneously add thereto between 10 and 30 percent food element having an admixture of starch, de-oiled soy meal, and animal protein; between 1 and 3 percent eatable cellulose gum; between 15 and 35 percent sweetening agent selected from the group consisting of dextrose, sugar and artificial sweeteners, between 2 and 4 percent sodium chloride; between 1 and 3 percent organic acid selected from the group consisting of citric acid and malic acid thereby establishing a pH in the range from 4.0 to 4.4 for the product; between 2 and 3 percent burnt caramel; between 0.02 and 0.08 percent tomato red dye; between 0.05 and 2.0 percent tomato flavoring; and a hydrating agent selected from the group consisting of single strength tomato juice, and water to hydrate the product to desired viscosity.

References Cited

UNITED STATES PATENTS

| | | | |
|---|---|---|---|
| 625,880 | 5/1899 | Gere | 99—124 |
| 665,323 | 1/1901 | Gere | 99—124 |
| 1,950,935 | 3/1934 | Thomas | 99—144 |
| 2,079,649 | 1/1935 | Allen | 99—124 |
| 2,400,460 | 5/1946 | Hall | 99—206 |
| 2,270,582 | 1/1942 | Esselen | 99—124 |
| 2,426,634 | 9/1947 | Melnick | 99—124 |
| 2,785,077 | 3/1957 | Kaufman | 99—206 |
| 2,912,338 | 11/1959 | Barner | 99—204 |
| 2,363,193 | 11/1944 | Moore | 99—206 |
| 3,009,815 | 11/1961 | Lorant | 99—204 |
| 3,100,909 | 8/1963 | Schapiro | 99—78 |
| 3,300,319 | 1/1967 | Marotta | 99—144 |
| 3,433,650 | 3/1969 | Black | 99—124 |
| 3,464,857 | 9/1969 | Marotta | 99—144 |

FOREIGN PATENTS

| | | | |
|---|---|---|---|
| 3,409 | 2/1899 | Great Britain | 99—124 |

OTHER REFERENCES

Handbook of Food Additives, 1968, pp. 38, 39, 260 and 261, T. E. Furia (ed.), Chemical Rubber Co., Ohio.

M. G. MULLEN, Primary Examiner

NORMAN YUDKOFF, Assistant Examiner

U.S. Cl. X.R.

426—190, 203, 212, 217